INVENTOR.
JEROME H. LEMELSON
BY
Arthur G. Fattibene
ATTORNEY

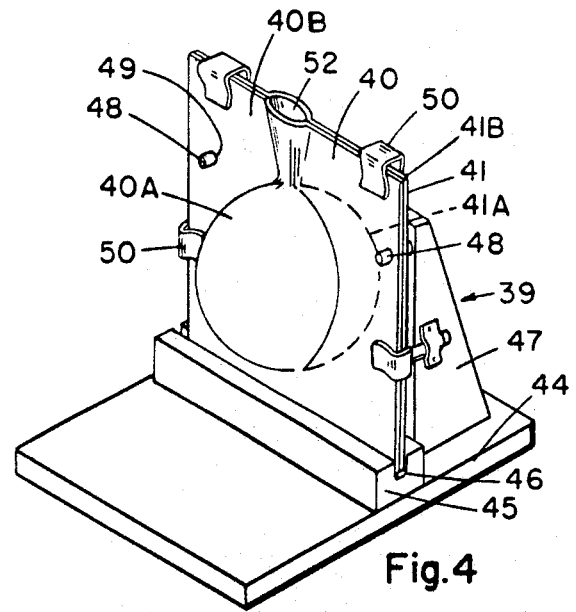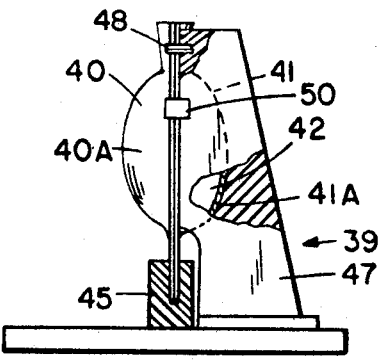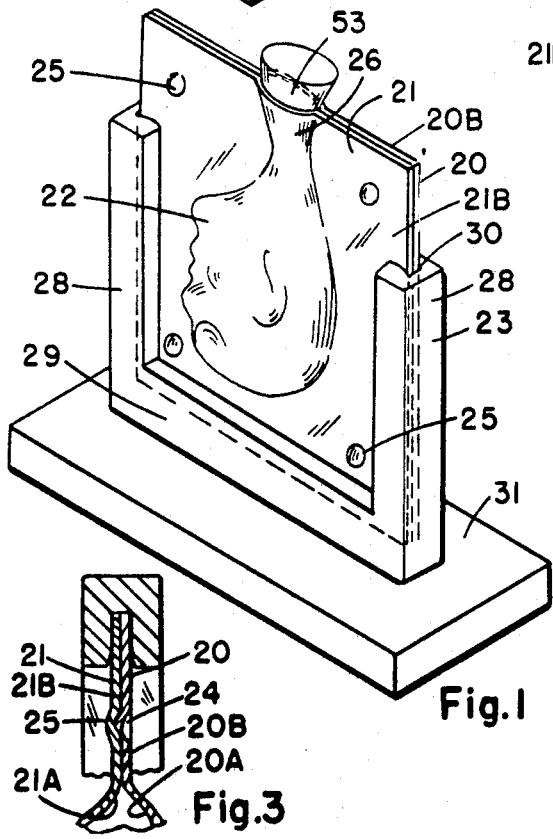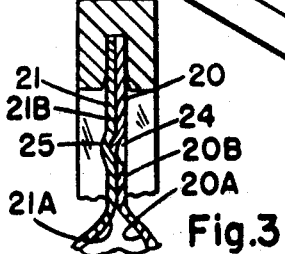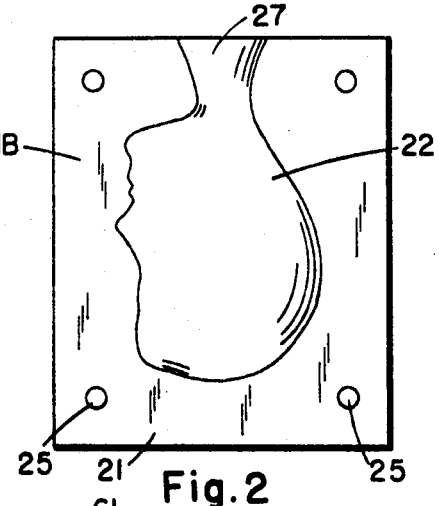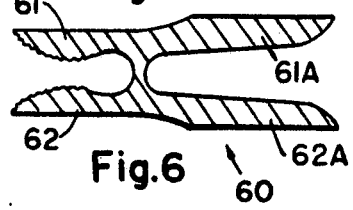
INVENTOR.
JEROME H. LEMELSON July 23, 1968  J. H. LEMELSON  3,393,890
MOLDING DEVICE Filed Oct. 20, 1965  4 Sheets-Sheet 2

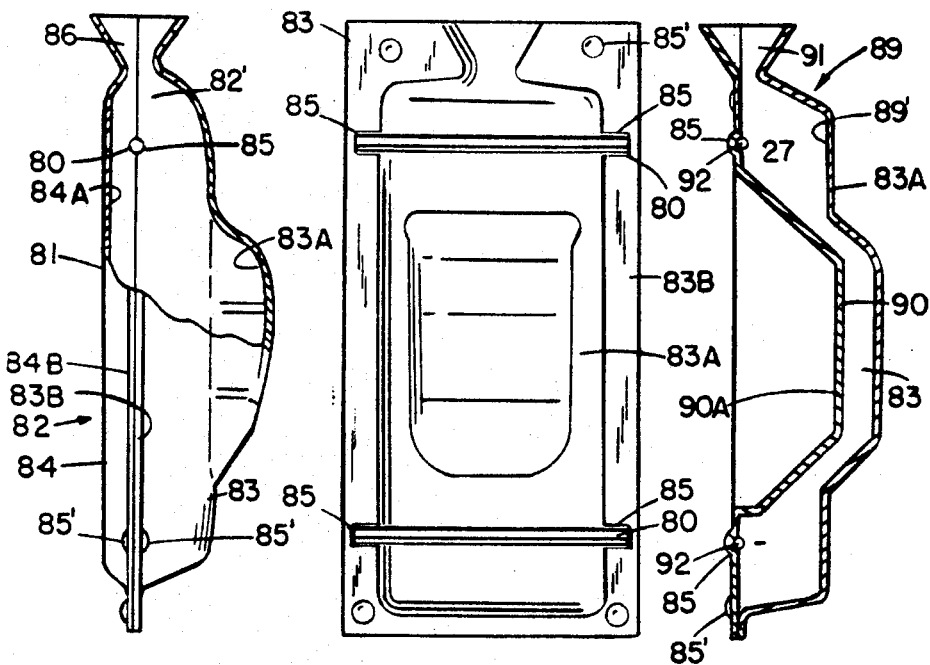
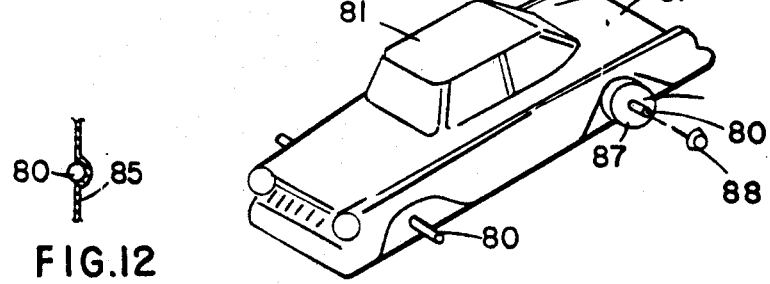

July 23, 1968     J. H. LEMELSON     3,393,890
MOLDING DEVICE

Filed Oct. 20, 1965     4 Sheets-Sheet 4

INVENTOR.
Jerome H. Lemelson
BY
Arthur F. Fattibene

United States Patent Office 3,393,890
Patented July 23, 1968

3,393,890
MOLDING DEVICE
Jerome H. Lemelson, 85 Rector St.,
Metuchen, N.J. 08840
Continuation-in-part of application Ser. No. 432,504,
Feb. 15, 1965, now Patent No. 3,332,658, dated
July 25, 1967. This application Oct. 20, 1965, Ser.
No. 498,467
2 Claims. (Cl. 249—92)

ABSTRACT OF THE DISCLOSURE

This disclosure is directed to a casting mold for casting articles of a casting liquid settable at room temperature which is formed of a thin sheet of deformable thermoplastic material having a central indentation circumscribed by a surrounding flat planar portion and having a depending circumscribing wall formed integrally with the outer edges of the flat, planar portion for supporting the mold on a supporting surface. A sub-indentation is formed in the flat, planar portion of the mold to communicate with the central indentation thereof and an article or holder is adapted to be supported in the sub-indentation so that the portion thereof extending into the central indentation of the mold is disposed below the level of the moldable liquid adapted to be placed into the central identation and whereby the end of the holder disposed in the sub-indentation is frictionally retained therein to form a seal therewith so as to prohibit the flow of moldable liquid through the sub-cavity.

---

This invention relates in general to molds and mold assemblies and is a continuation-in-part of my application, Ser. No. 432,504, filed Feb. 15, 1965, now Patent No. 3,332,658 and which relates to my copending application, Ser. No. 281,306 filed on May 17, 1963, and which is entitled, Molding Technique. In particular this invention relates to a relatively low cost mold which may be advantageously used for forming various shaped figures or articles from comestibles, plaster, and other relatively low temperature settable materials such as wax, plastics, and the like that can readily solidify at ordinary room temperature.

It is an important object of this invention to provide an improved relatively low cost mold which may be used for casting moldable food material such as ice cream, ices, gelatin, and the like into various shaped figures and forms.

Another object is to provide a molding device which can be readily adapted for use as a toy by relatively young children whereby they can mold their own play things such as soldiers, dolls, vehicles, and the like from a relatively low temperature moldable material such as wax and/or a moldable plastic material in a relatively safe and simple manner.

Another object is to provide a molding device which can be readily fabricated from relatively low cost material as by molding, or by pressure or vacuum forming relatively thin sheets of thermoformable sheet material, such as plastics of the type including polystyrene, cellulose acetate, polyvinyl chloride, propionate and the like.

Another object is to provide a low cost molding device in which an article support or axle may be molded in situ within the moldable figure resulting therefrom and serve as a support or means for attaching other members thereto.

The foregoing objects and other features and advantages are attained in one form of the invention by a relatively low cost molding device comprising of a pair of relatively thin walled members formed of thermoformable material having formed therein complementary indentations to define a molding cavity when the pair of members are disposed in continuous abutting relationship. Means are provided on the respective members for insuring accurate registration of the respective indentation thereof to define the molding cavity. A means is also provided to define an inlet through which the molding or casting liquid is poured into the molding cavity so formed. Means are also provided for holding the respective thin walled members in continuous abutting relationship while the moldable liquid is setting within the cavity.

In another form of the invention, the molding cavity may be formed of a single sheet of a thin walled material which has an indentation therein to define the entire molding cavity of the article to be molded. If desired, means are also provided in this form of the invention for molding in situ in a moldable figure, an article which has a portion thereof projecting into the main cavity of the mold so that when the moldable material is poured into the mold and hardens, the article will be retained in the molded figure resulting thereby.

Another form of the invention the molding device may be formed of a pair of complementary thin walled members in which complementary indentations are formed to define a molding cavity. In this form of the invention, sub-cavities may be formed for receiving and supporting therein an article which is to be molded in situ in the moldable material from which the figure is molded so that the article thus connected molded figure.

A feature of this invention resides in a relatively simple mold that can be readily fabricated of inexpensive material in a simple and economical manner, and which is positive in operation.

Another feature of this invention resides in the provision of a relatively simple mold which can be reused for an indefinite period of time.

Still another feature of this invention resides in the provision of an improved mold construction in which an article can be readily molded in situ within the moldable material setting in the molding cavity of the mold.

Other features and advantages will become more readily apparent when considered in view of the description and drawings in which:

FIGURE 1 is a perspective view of a mold constructed in accordance with the instant invention.

FIGURE 2 is a front view of the mold with the holder therefor removed.

FIGURE 3 is a fragmentary sectional view taken along line 3—3 of FIG. 1.

FIGURE 4 is a perspective view of a modified form of the invention.

FIGURE 5 is an end view of the embodiment of FIG. 4 with portions thereof shown in section.

FIGURE 6 is a cross sectional view of a modified holder means.

FIGURE 10 is a side elevation view of another modified mold construction having parts thereof shown in section.

FIGURE 11 is a plan view of one of the mold sections of FIG. 10.

FIGURE 12 is a sectional view taken along line 12—12 of FIG. 11.

FIGURE 13 is a side elevation view of another modified mold construction.

FIGURE 14 is a perspective view of a vehicle figure formed in the mold construction of either FIG. 10 or 13.

Figure 7:
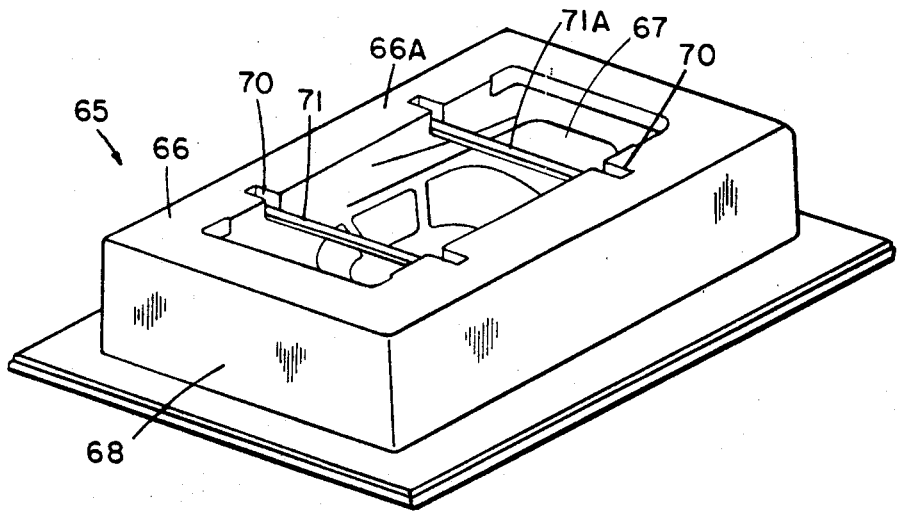
FIGURE 7 is a perspective view of another modified form of the invention.
Figure 8:
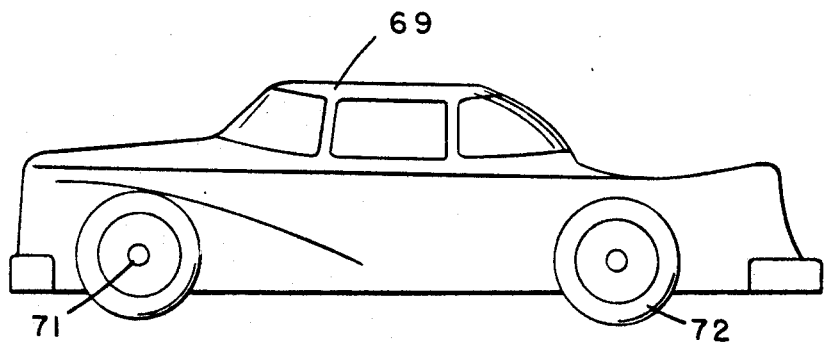
FIGURE 8 is a side view of a figure formed from the molding device of FIG. 7.

Referring to the drawings, there are shown several embodiments of a mold construction embodying the instant invention. The mold construction of FIGS. 1 to 3 comprises a pair of complementary thin wall members 20 and 21 shaped to define a molding cavity 22 therebetween, and a holder 23. Preferably, the thin wall members 20 and 21 are formed of a thermoplastic material in which the indentations 20A and 21A are readily formed, as for example, either by a pressure forming or a vacuum forming operation. However, it will be understood that the mold members 20 and 21 may be formed of other thin wall materials such as, for example, foil, paper, sheet metal, or the like. Accordingly, each of the thin wall members 20 and 21 have formed therein complementary indentations 20A and 21A, which in the assembled form define a molding cavity 22 when the planar portions 20B and 21B of the respective thin wall members are disposed in abutting, contiguous relationship as seen in FIGS. 1 and 2.

In the illustrated form of the invention of FIGS. 1 and 2, the molding cavity 22 is shaped in the form of a human bust. Each of the respective wall members 20 and 21 are provided with complementary means to effect registration of the indentations of the respective mold members 20 and 21 to insure accurate alignment of the mold indentations in the assembled position of the mold. As best seen in FIG. 1, the registration means comprises complementary dimples 24 and 25 formed in the corner planar portions of the thin wall members 20 and 21. Thus, when the dimples 24 formed in sheet member 20 are disposed in registration with the complementary dimples 25 formed in sheet member 21, the indentations 20A and 21A of the respective mold members are registered to define an accurate molding cavity.

Formed in the respective mold members 20 and 21 is an indentation 26 to define an inlet 27 through which a suitable moldable liquid is poured into the cavity, as for example, a wax, a comestible, such as ice cream, gelation, ices, and the like, or other suitable relative low temperature settable liquids.

To maintain the respective thin wall members 20, 21 in registration, a holding means 23 is provided. In the form of the invention shown in FIGS. 1 and 3, the holding means comprises a U-shaped holder having opposed upright leg portions 28 interconnected by a bight portion 29. Along the inner edge of the U-shaped portion thus defined, there is provided a groove or slot 30 of sufficient width to accommodate the double thickness of the end wall members 20 and 21 in the assembled position thereof. Accordingly, with the mold assembled as seen in FIG. 1 and held together by holder 23, the moldable material can then be readily poured through the inlet 27 defined by sub-indentations 26. To render the holding means self-supporting, an enlarged base 31 may be connected or formed integral to the bight portion 29 of the holder.

While the illustrated embodiment of FIGS. 1 and 2 discloses the molding cavity in the shape of the human bust, it will be readily understood that the molding cavity may be formed to define any suitable shape or form.

The mold construction described may be readily used as a household appliance for molding such comestibles as gelatin salads, ice cream, ices and the like. Also, the mold device described may be rendered readily applicable for use as a toy by young children. When used as a toy, a child may form his own play things from relatively low temperature setting materials such as plaster, certain plastics, waxes and the like. The playthings which can be readily molded may comprise cars, airplanes, boats, ships, tanks, soldiers, dolls, and the like, with which a child may amuse himself after he has formed the same.

FIGS. 4 and 5 illustrate a slightly modified form of the invention. In this form of the invention, mold 39 comprises a pair of thin wall members 40 and 41 each formed with complementary indentations 40A and 41A to define in the assembled position thereof a molding cavity 42 as hereinbefore described. As shown, the holder 43 for supporting the respective mold members 40 and 41 in contiguous abutting relationship comprises a base member 44 on which a bar 45 extends transversely thereof. The bar 45 is formed with a groove 46 and is sized to accommodate or receive the bottom peripheral edge portion of the assembled mold members 40 and 41. An upright support 47 is connected to the base member 44, and it is provided with projecting pins 48 which are adapted to extend through openings 49 formed in the planar portions 40B and 41B of the respective mold members 40 and 41. The arrangement is such that projection of the pins 48 through the opening 49 effect registration of the complementary indentations of the mold members 40 and 41 in the assembled position thereof.

Suitable clamp means 50 are connected to the support 47 for maintaining the side and upper peripheral portions of the mold members 40 and 41 in contiguous abutting relationship in the assembled position.

In the form illustrated in FIGS. 4 and 5, the complementary indentations defined in the assembled form a substantially spherical form. Connected in communication with the interior of the molding cavity defined by mold members 40 and 41 is an inlet 52 through which the moldable material is poured into the cavity.

FIG. 6 illustrates a modified form of holder 60. As shown, the holder of FIG. 6 comprises simply an integrally formed plastic clip which is substantially H shaped in cross section. The gripper portion of the clip is defined by spaced jaw portions 61 and 62 which are serrated along the inner edge thereof to assure positive gripping action. An arrangement of the clip is such that the inherent resiliency and memory of the material from which it is formed tends to bias the jaw members 61 and 62 toward their closing or gripping position. Thus, a force exerted on the other ends 61A and 62A of the clip will cause the jaw portions 61 and 62 to spread toward an open position. Thus it will be readily apparent that by utilizing several of the clips, as described, in circumferentially spaced relationship about the planar portion of the mold construction, as described with reference to FIGS. 1 to 3 or 4 and 5, can be utilized to secure the respective mold members thereof together.

FIGURE 7 illustrates a modified form of the invention. In this form of the invention, the mold 65 is defined by a single sheet of thin wall material 66. In the illustrated embodiment of FIG. 7, the thin wall material 66 is defined by a planar portion 66A in which a molding cavity 67 is formed. Connected to the peripheral edge of the planar portion 66A is a circumscribing depending wall 68 to space the planar portion 66A from a supporting surface. Accordingly, the mold 65 of FIG. 7 may be readily formed either by vacuum forming or pressure forming.

In the illustrated embodiment of FIG. 7, cavity 67 is shaped to define the exterior portion of an automobile or vehicle 69. Formed integral with the main cavity 67 of the mold, there is formed a plurality of laterally extending sub-cavities 70 adjacent either end of the main cavity. The sub-cavities 70 define a recess for retaining therein an article, which in the illustrated embodiment comprises a rod 71, which is to function as the axle of the vehicle to be molded. Accordingly, as shown in FIG. 7, the article or rod forming the axle has its end portions supported in the opposed sub-cavities 70 with the intermediate portion 71A extending across the main cavity 67. The axle 71 resting in cavities 70 is spaced from the top 66A of the mold 65 by the depth of the sub-cavity and may also comprise means for rotating the article molded therein or otherwise supporting same.

To form the article, a molding or casting material is poured directly into the cavity 67 until the level of the molding liquid is substantially flush with the top planar surface 66A of the mold whereby the intermediate part of the rod or axle is submerged below the level of the moldable material. When the material has set, the rod or axle 71 is embedded in situ within the moldable or settable material. After the material has set, and the article formed is removed from the mold, wheels 72 may then be rotatably journalled on the extended end portions of the axles so that the figure of the vehicle may be completed.

Figure 9:
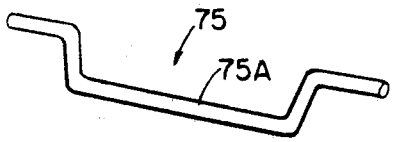
FIGURE 9 is a detailed view of a modified axle construction for use in FIG. 7 for use in a figure constructed from the mold of FIG. 7.

In FIG. 9, a modified axle construction 75 is shown. In this form of the invention, the axle 75 is provided with a U shaped configuration 75A intermediate the ends thereof. Accordingly, with the construction of the axle shown in FIG. 9, the intermediate portion 75A thereof is thus offset so that it will extend deeper within the body of the cavity 67 of mold 65 when such axle construction is employed.

FIGS. 10 and 11 illustrate a further modified mold construction comprising an assembly 82 in which the axle 80 of a vehicle 81 may be molded directly into the body of the vehicle. As shown, the mold 82 is defined by a pair of thin wall sheet members 83 and 84, preferably formed of a suitable plastic material. Each has formed therein complementary indentations 83A and 84A which may be formed by vacuum or pressure forming. One of the mold members 83 has an indentation 83A which defines an upper portion of a vehicle to be formed and the indentation thereof is circumscribed by a substantially rectangular planar portion 83B. Extending laterally adjacent the front and rear ends of the main indentation 83A, are a pair of opposed axially aligned laterally extending sub-cavities 85 in which the article or axle 80 is adapted to be positioned. Since the sub-cavities 85 are formed in the planar portion of the mold member 83 that circumscribes the molding cavity 83A, the rods or axles supported therein are disposed below the plane of the planar marginal portion that circumscribes the cavity 83A. The complementary mold portion 84, formed of a thin wall sheet material, has formed therein a relatively shallow indentation 84A to define the under portion of the vehicle to be formed. Surrounding the indentation 84A of member 84 is a planar portion 84B adapted to be disposed in contiguous relationship with the planar portion of the mold member 83 in the assembled position of the mold. When the respective complementary thin wall members 83 and 84 are assembled and respective planar marginal portions thereof are disposed in contiguous relationship, the rods or axles 80 are held captive therebetween in the sub-cavity across the molding cavity 82'.

Means in the form of complementary dimples 85' as hereinbefore described are provided in the corner portions of the mold members 83, 84 to place the respective indentations 83A and 84A into registration.

The respective mold members 83 and 84 in turn are maintained in registration by any of the suitable holding means hereintofor described. Thus, when a material is poured into the cavity through the inlet 86 defined by the mold members, the material will flow around the axles 80 held captive between the mold members 83, 84. Thus, after the material has set, the respective mold members are readily separated In the removal thereof from the holders, and the axles trapped between them are embedded in the article molded.

Wheels 87 may then be rotatably attached to the extended ends of the axle 80 by means of a fastener 88, the latter shaped to simulate the hub of a wheel as shown in FIG. 14. Accordingly, when used as a toy, young children can mold and build their own toys in a relatively simple and inexpensive manner.

FIGURE 13 illustrates another form of mold construction for forming a vehicle or other suitable shape. In this form, the mold assembly 89 comprises molding members 83 and 90, each being provided with complementary molding indentations 83A and 90A. In this form of the invention, the respective indentations 83A and 90A are concave in the same direction so as to nest in the assembled position the respective mold members 83 and 90. Thus, the mold defines an external shell or shape of a figure to be formed, thus requiring only a minimum of moldable material to be used to define the molded article. For all practical purposes, member 83 of FIG. 13 is substantially similar to that hereinbefore described with reference to FIGS. 10 and 11, i.e., it is provided with sub-indentations 85 formed in the planar portion which circumscribes the main indentation 83A. The respective complementary members 83, 90 are also formed so that the respective indentations 83A and 90A when nested retain an axle in proper position therebetween as indicated in FIG. 13. The spacing between the respective indentations 83A and 90A of the thin wall members 83 and 90 are connected into communication with an inlet 91 through which the moldable material is poured. Accordingly, axles 92 are readily molded in situ within the mold when material sets. When the respective thin wall members 83 and 90 are separated the axles are then embedded in the cast articles. The end portions of axles that extend beyond the outline of the figures are then fitted with wheels to complete the vehicle so cast.

Figure 15:
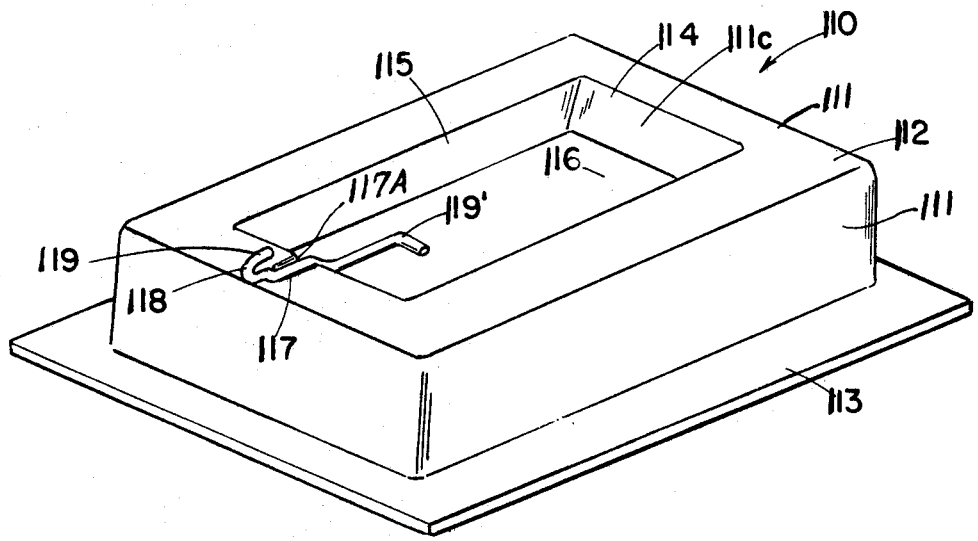
FIGURE 15 is a perspective view of another modified form of the invention.

FIGURE 15 illustrates another modified form of the invention. In this form of the invention, the mold 110 is illustrated as being formed of a single sheet of thin wall material. Accordingly, the mold 110 may be formed of a suitable thermoplastic material which may be vacuum formed into the desired shape, e.g. as illustrated or the mold 110 may be injection molded. Also, the mold 110 may be formed of suitable sheet metallic material which may be drawn or stamped to shape.

In the illustrated form, the mold 110 is defined by a circumscribing planar portion 112 that circumscribes a molding cavity 111C which is formed or depressed in the central surface thereof. Accordingly, the molding cavity 111C is defined as an indentation having a circumscribing wall portion defined by opposed end wall portions 114 and opposed side wall portions 115, and a bottom wall portion 116.

Accordingly, the molding cavity or indentation 111C is adapted to receive a body of moldable liquid which is adapted to set to define a molded article conforming to the shape of the molding cavity 111C, as will be hereinafter described.

A circumscribing depending wall 111 is formed integral with the peripheral outer edge of the planar portion 112. As shown, the height of the circumscribing depending wall 111 is made greater than the depth or indentation of the molding cavity 111C so that the circumscribing wall 111 may support the same from a supporting surface. If desired, a laterally extending flange 113 may be formed integral with the circumscribing depending wall 111 to provide a more stable support for the mold. It will be understood that the molding cavity may be formed in any suitable shape in which the moldable liquid is desired to be formed.

In accordance with this invention, a sub-cavity 117 is formed in one end of the planar surface. As shown, one end 117A of the sub-cavity 117 is disposed into communication with the main cavity or indentation 111C.

An article 118 is retained in the sub-cavity 117 so that one end portion 119 projects into the indentation or molding cavity 111C. In the illustrated form of the invention, the article 118 adapted to be held in the sub-cavity 117 may comprise a wire which is particularly formed so that one end 119' projects into the main molding cavity, and the other end 119 thereof is reversely bent to provide means whereby the article may be gripped upon the setting of the molded material to remove the same from the mold. As shown, the inner end 119' of the wire or article projecting into the molding cavity is provided with a laterally bent end portion. By providing the lateral bend at end 119', it will be noted that when the liquid moldable material has set, the lateral bend prevents the article 118 from being withdrawn from the mold resulting therefrom. The intermediate portion of the article 118 is disposed in the sub-cavity, with the projecting end being laterally deformed intermediate the length thereof so that the projected end 119' is disposed beneath the level of the molding liquid when the main molding cavity 111C is filled with a moldable liquid.

The arrangement of the sub-cavity 117 in conjunction with the article 118 adapted to be held therein is such that the article may be readily maintained in place by frictional engagement thereof with the side walls of the sub-cavity 117. Accordingly, it will be noted that the article 118 retained in the sub-cavity will be held in place during the setting of the moldable liquid in the molding cavity 111C. Accordingly, after the liquid has set, the molded material may be removed from the cavity simply by lifting the end 119 of the article 118. Also, since the article 118 is permanently embedded in the article mold, it may be utilized as the means for handling, hanging or holding the molded object.

Figure 16:
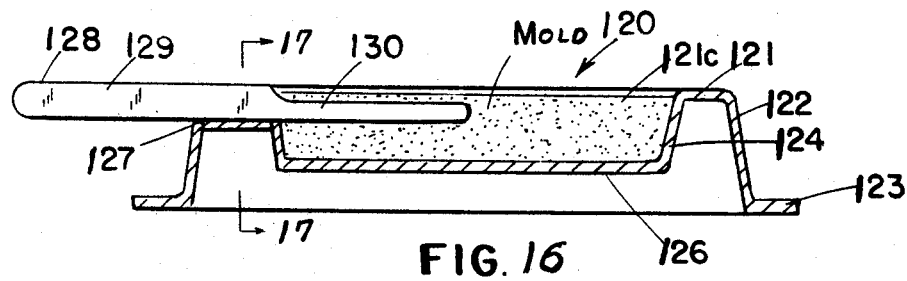
FIGURE 16 is a sectional view of still another form of the invention.
Figure 17:
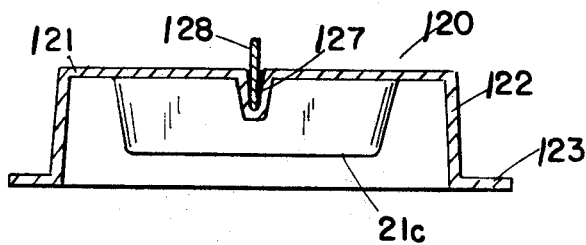
FIGURE 17 is a section view taken along line 17—17 of FIG. 16.

FIGURES 16 and 17 illustrate a modified form of the invention. In this form of the invention, the mold device 120 is likewise defined by a single sheet of material of plastic, metal and the like, which is formed with a planar portion 121 circumscribing an indentation or cavity 121C. Accordingly, the main molding cavity 121C is defined by circumscribing depending walls 124 and a bottom wall 126. In accordance with this form of the invention, a sub-cavity 127 is formed in the planar surface 121 in at least one end thereof which extends through the circumscribing wall 122 and the circumscribing wall 124 of the molding cavity. Accordingly, the sub-cavity 127 is disposed in communication therewith. If desired, a laterally extending flange 123 may be integrally formed with the circumscribing, depending wall 122 which supports the molding cavity off a supporting surface.

In accordance with this invention, an article 129 is adapted to be retained in the sub-cavity 127 so that one end thereof 130 extends into the molding cavity 121C and the other end 128 thereof extends outwardly beyond the depending circumscribing wall 122. In this form of the invention, it is to be noted that the article may comprise a stick 129 which has its end 130 extending into the molding cavity formed as a reduced end portion. The purpose of reducing the end 130 of the stick is insured that the extended end 130 is submerged beneath the level of the molding liquid adapted to be located in the molding cavity as indicated.

In this form of the invention, it is to be noted that the sub-cavity 127 which is in communication with the main molding cavity 121C is shaped so as to frictionally retain between the side walls thereof the stick or article 129 as best seen in FIG. 17. Accordingly, the article is frictionally retained in the sub-cavity 127 and it also functions as a seal to prevent the liquid in the mold from escaping through the end of the sub-cavity 129. Accordingly, with the article 129 in position and the moldable liquid poured into the molding cavity, so that the level of liquid is above the end of the stick as shown in FIG. 16, it will be noted that upon hardening of the liquid, the stick is embedded in the moldable fluid. Accordingly, the liquid upon setting can be readily removed simply by raising the end of the stick to remove the molded article from the cavity.

Accordingly, it will be noted that the molding devices herein described may be readily adapted for use in molding various types of material, as for example, plasters, wax, plastic, ice cream, ices, gelatines and the like into any desired form depending upon the configuration or shape of the mold.

From the foregoing it will be noted that cavities defined by the respective molds herein described may be shaped to assume any desired configuration or form. Also the type of moldable material which is poured into the respective mold may vary depending upon the use or application of the mold. The instant invention contemplates that articles may be molded in situ within the molded figure resulting thereby so that, as for example, in the case of forming a molded plaque or the like, a supporting hook or holder may be molded in situ therein. In the case of molding comestibles, such as ice cream, ice and the like, a stick by which the same may be held may be molded thereinto; or when used in toy making, the axles of vehicles as herein described.

While the instant invention has been described with reference to a particular embodiment thereof, it will be appreciated and understood that variations and modifications thereof may be made without departing from the spirit or scope of the instant invention.

What is claimed is:

1. A casting mold for casting articles of a casting liquid settable at room temperature comprising a thin sheet of thermoplastic material which has formed therein a centrally disposed indentation defining a molding cavity for receiving and retaining therein a casting liquid when said mold is positioned with said indentation disposed downwardly, and a flat planar portion surrounding said cavity, said planar portion having formed therein a sub-indentation disposed in communication with said molding cavity and projecting outwardly therefrom wherein said sub-indentation has a substantially smaller volume than the volume of said molding cavity,
   a circumscribing depending wall formed integrally with the outer edge of said flat, planar portion for supporting said indentation on a supporting surface and a circumscribing base extending laterally about the bottom edges of said depending wall,
   said sub-indentation being adapted to receive a holder for the article to be cast in said mold, said holder comprising a flat member having a reduced end portion and an enlarged end portion whereby the enlarged end portion of said holder is adapted to be received and held in place in said sub-indentation so that the reduced end portion thereof projects into the volume defined by the main indentation so that said enlarged end portion extends above the flat planar portion of the mold and the reduced end portion of the holder extends into the main cavity so as to be disposed below the level of the molding liquid adapted to be received therein so that when a casting liquid is poured into the main indentation and substantially fills the cavity, the reduced end of the holder will be beneath the surface of the casting liquid in said cavity and will become imbedded in the resulting casting and whereby the enlarged end portion received in said sub-cavity forms a seal therewith to prohibit the flow of moldable liquid to said sub-cavity.

2. A mold formed of relatively thin sheet material for casting solid figures from a relatively low temperature casting liquid comprising:
   a single sheet of thin wall material having an indentation formed in the central planar surface thereof, said indentation being circumscribed by a flat, planar portion,
   a circumscribing depending wall formed integrally with the outer edge of said planar portion for supporting said indentation,
   and a circumscribing base extending laterally of said depending wall,
   means formed in said flat, planar portion defining oppositely disposed sub-cavities, each of said sub-cavities being disposed in the flat, planar portion of said mold intermediate the width thereof between the circumscribing depending wall and the central indentation, each of said sub-cavities being disposed in communication with said central indentation, said sub-cavities being adapted to receive the opposed end portions of an article whereby the intermediate portion of said article is disposed transversely of said indentation and beneath the surface of the moldable liquid adapted to be poured into said cavity, so that when said liquid hardens, said article will be retained by the solid figure resulting therefrom with the opposed ends of the article extending beyond the solid figure upon removal of the solid figure from the mold.

References Cited

UNITED STATES PATENTS

| | | | |
|---|---|---|---|
| 1,095,866 | 5/1914 | Horat | 249—96 |
| 1,312,325 | 8/1919 | Hinck | 249—97 |
| 2,151,282 | 3/1939 | Stamp | 249—96 |
| 2,193,342 | 3/1940 | Price | 249—92 |
| 2,212,764 | 8/1940 | York | 249—160 |
| 2,312,046 | 2/1943 | Neilson | 249—97 |
| 2,591,261 | 4/1952 | Holahan | 249—92 |
| 2,682,234 | 6/1954 | Baldanza | 249—92 |
| 3,109,201 | 11/1963 | Dulmage | 249—94 |
| 3,295,818 | 1/1967 | Kreier | 249—134 |

FOREIGN PATENTS 216,516   8/1958   Australia.

J. HOWARD FLINT, JR., *Primary Examiner.*